United States Patent
Guthrie et al.

(10) Patent No.: US 7,357,363 B2
(45) Date of Patent: *Apr. 15, 2008

(54) EXPANSION BOLT

(76) Inventors: Karl Guthrie, 49 Cypress Fairway Village, Wimberley, TX (US) 78676; Joseph Schwartz, 28 W. Inwood Forrest, Wimberley, TX (US) 78676

( * ) Notice: Subject to any disclaimer, the term of this patent is extended or adjusted under 35 U.S.C. 154(b) by 0 days.

This patent is subject to a terminal disclaimer.

(21) Appl. No.: 11/374,713

(22) Filed: Mar. 13, 2006

(65) Prior Publication Data

US 2006/0231709 A1 Oct. 19, 2006

Related U.S. Application Data

(63) Continuation of application No. 10/749,728, filed on Dec. 30, 2003, now Pat. No. 7,011,281.

(51) Int. Cl.
*A47B 96/06* (2006.01)

(52) U.S. Cl. ............... 248/231.31; 248/925; 411/44; 411/80

(58) Field of Classification Search ........... 411/57.1, 411/60.1, 80, 44, 54; 248/231.21, 231.9, 248/231.91, 925, 317, 231.31; 403/365–368
See application file for complete search history.

(56) References Cited

U.S. PATENT DOCUMENTS

| | | | | |
|---|---|---|---|---|
| 1,115,205 A | * | 10/1914 | Johnson | 411/60.1 |
| 1,469,666 A | * | 10/1923 | Pleister et al. | 411/24 |
| 2,570,618 A | * | 10/1951 | Werner | 411/60.1 |
| 2,774,273 A | * | 12/1956 | Olson | 411/78 |
| 2,835,949 A | * | 5/1958 | Wengen et al. | 403/368 |
| 2,896,494 A | * | 7/1959 | Lerick | 411/76 |
| 3,021,745 A | * | 2/1962 | Libom | 411/76 |
| 3,042,094 A | * | 7/1962 | Liljeberg | 411/271 |
| 3,139,730 A | * | 7/1964 | Duane et al. | 405/259.3 |
| 3,147,527 A | * | 9/1964 | Gilmore | 403/368 |
| 3,216,306 A | * | 11/1965 | Taylor | 411/78 |
| 3,338,128 A | * | 8/1967 | Taylor | 411/79 |
| 3,352,193 A | * | 11/1967 | Lerich | 411/79 |
| 3,478,641 A | * | 11/1969 | Dohmeier | 411/79 |
| 3,903,785 A | * | 9/1975 | Pepper, Jr. | 248/694 |
| 3,948,485 A | * | 4/1976 | Chouinard et al. | 248/694 |
| 3,957,237 A | * | 5/1976 | Campbell | 248/694 |
| 4,044,976 A | * | 8/1977 | Campbell | 248/694 |
| 4,069,991 A | * | 1/1978 | Saunders et al. | 248/694 |
| 4,082,241 A | * | 4/1978 | Burkey | 248/317 |
| 4,108,026 A | * | 8/1978 | Anderson et al. | 81/488 |
| 4,184,657 A | * | 1/1980 | Jardine | 248/231.9 |
| 4,422,607 A | * | 12/1983 | Vallance | 248/694 |
| 4,464,076 A | * | 8/1984 | Leibhard | 403/297 |
| 4,491,291 A | * | 1/1985 | Ching | 248/231.9 |
| 4,506,924 A | * | 3/1985 | Nieder | 294/89 |
| 4,518,290 A | | 5/1985 | Frichmann et al. | |
| 4,572,464 A | * | 2/1986 | Phillips | 248/231.9 |
| 4,575,032 A | * | 3/1986 | Taylor | 248/231.9 |
| 4,607,992 A | * | 8/1986 | Mauritz et al. | 411/45 |
| 4,611,963 A | * | 9/1986 | Frohlich et al. | 411/54 |

(Continued)

*Primary Examiner*—William L. Miller
(74) *Attorney, Agent, or Firm*—Portland Intellectual Property, LLC

(57) ABSTRACT

An expansion bolt. A first chock has first and second outer ramping surfaces. A second chock has an inner ramping surface complementarily corresponding to the first outer ramping surface. A spring member biases the second chock radially inwardly against the first outer ramping surface of the first chock.

4 Claims, 3 Drawing Sheets

U.S. PATENT DOCUMENTS

| | | | |
|---|---|---|---|
| 4,643,377 A * | 2/1987 | Christianson | 248/231.9 |
| 4,643,378 A * | 2/1987 | Guthrie et al. | 248/231.9 |
| 4,715,568 A * | 12/1987 | Best, Jr. | 248/231.9 |
| 4,773,803 A * | 9/1988 | Huegel et al. | 411/55 |
| 4,818,163 A * | 4/1989 | Bereiter et al. | 411/44 |
| 4,832,289 A * | 5/1989 | Waggoner | 248/231.9 |
| 4,834,327 A * | 5/1989 | Byrne | 248/231.9 |
| 4,869,342 A * | 9/1989 | Borst | 182/90 |
| 4,923,160 A * | 5/1990 | Waggoner | 248/200 |
| 5,042,888 A * | 8/1991 | Shinjo | 411/54 |
| 5,154,558 A * | 10/1992 | McCallion | 411/54 |
| 5,161,916 A * | 11/1992 | White et al. | 405/259.6 |
| 5,181,816 A * | 1/1993 | Walsh | 411/57.1 |
| 5,253,964 A * | 10/1993 | Swemmer | 411/79 |
| 5,256,016 A * | 10/1993 | Godfrey | 411/32 |
| 5,344,252 A * | 9/1994 | Kakimoto | 403/358 |
| 5,484,132 A * | 1/1996 | George et al. | 248/231.9 |
| 5,651,650 A * | 7/1997 | Herb et al. | 411/78 |
| 5,860,629 A * | 1/1999 | Reed | 248/231.9 |
| 5,941,668 A * | 8/1999 | Kaibach et al. | 411/60.2 |
| 6,042,069 A * | 3/2000 | Christianson | 248/231.9 |
| 6,062,784 A * | 5/2000 | Wisser et al. | 411/267 |
| 6,068,226 A | 5/2000 | Anders | |
| 6,092,773 A * | 7/2000 | Kieliszewski | 248/231.9 |
| 6,109,578 A * | 8/2000 | Guthrie et al. | 248/231.9 |
| 6,119,993 A * | 9/2000 | Youngblood et al. | 248/231.9 |
| 6,273,379 B1 * | 8/2001 | Phillips | 248/231.9 |
| 6,283,426 B1 * | 9/2001 | Guthrie et al. | 248/231.9 |
| 6,299,397 B1 * | 10/2001 | Mengel | 411/24 |
| 6,375,139 B1 * | 4/2002 | Murray et al. | 248/231.9 |
| 6,493,922 B2 * | 12/2002 | Phillips | 29/558 |
| 6,679,466 B2 * | 1/2004 | Brown | 248/231.9 |
| 6,712,544 B2 * | 3/2004 | Kruger et al. | 403/408.1 |
| 6,712,572 B2 * | 3/2004 | Bisping et al. | 411/60.1 |
| 6,729,821 B2 * | 5/2004 | Guthrie et al. | 411/80 |
| 6,736,359 B2 * | 5/2004 | Murray | 248/231.9 |
| 6,948,573 B2 * | 9/2005 | China et al. | 175/269 |
| 2002/0014566 A1 * | 2/2002 | Phillips | 248/231.91 |
| 2002/0054805 A1 * | 5/2002 | Kaibach et al. | 411/60.1 |
| 2002/0098054 A1 * | 7/2002 | Guthrie et al. | 411/60.1 |
| 2002/0162927 A1 * | 11/2002 | Brown | 248/231.9 |
| 2003/0017023 A1 * | 1/2003 | Bisping et al. | 411/60.1 |
| 2003/0057337 A1 * | 3/2003 | Brown | 248/231.9 |
| 2003/0198529 A1 * | 10/2003 | Warmolts et al. | 411/57.1 |
| 2004/0035992 A1 * | 2/2004 | Watts | 248/231.9 |
| 2004/0096288 A1 * | 5/2004 | Haug et al. | 411/57.1 |
| 2004/0213633 A1 * | 10/2004 | Guthrie et al. | 403/367 |
| 2004/0253075 A1 * | 12/2004 | Liebig et al. | 411/57.1 |
| 2005/0037023 A1 * | 2/2005 | Field, Jr. | 424/195.15 |
| 2005/0098696 A1 * | 5/2005 | Lowe | 248/231.9 |
| 2005/0145765 A1 * | 7/2005 | Petzl | 248/231.9 |
| 2005/0145766 A1 * | 7/2005 | Petzl | 248/231.91 |
| 2005/0161565 A1 * | 7/2005 | Tusting et al. | 248/231.9 |
| 2005/0161566 A1 * | 7/2005 | Tusting et al. | 248/231.9 |
| 2005/0161567 A1 * | 7/2005 | Tusting et al. | 248/231.9 |

* cited by examiner

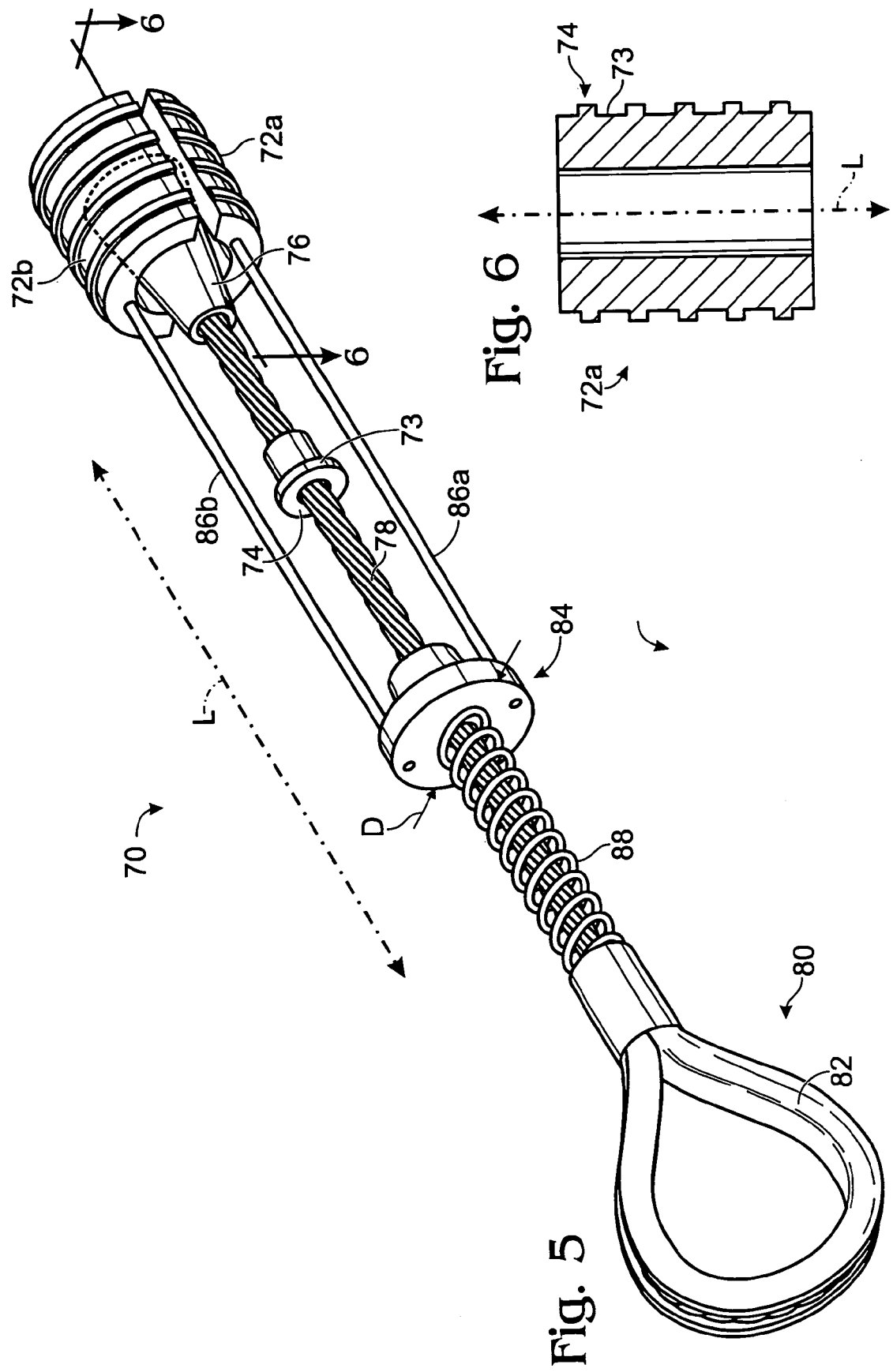

EXPANSION BOLT

This is a continuation of U.S. Ser. No. 10/749,728, filed Dec. 30, 2003, now U.S. Pat. No. 7,011,281.

BACKGROUND

The present invention relates to an expansion bolt, particularly for use in engaging drilled holes. The application incorporates by reference herein in its entirety the inventors' U.S. Pat. No. 6,109,578, wherein a description of the related art as it concerns rock climbing is provided. The borehole-engaging apparatus of the '578 Patent provides a number of advantages over the prior art, such as simple construction, reliable operation, greater standardization, which reduces the cost per unit and the amount of gear that a climber must purchase and carry, and robustness or insensitivity to rotational orientation about the apparatus' longitudinal axis. For many purposes, including rock climbing, it is particularly important that the expansion bolt be easily removable. The lack of this feature is exemplified by an embodiment of an anchoring device shown in FIG. 3 of Dohmieier, U.S. Pat. No. 3,478,641, which biases hole gripping dogs outwardly with a brindle which is not accessible for removing the device.

The novel expansion bolt of the present invention provides advantages similar to those of the '578 Patent, as well as outstanding ease of insertion and removal, and hole-engaging or holding strength.

In addition to the problems associated with anchoring to rocks for rock climbing, the construction industry and providers of emergency services such as fire, police and rescue service often have the need for anchoring structures or devices for temporary use. For example, temporary shelter may be needed, and tents may need to be erected quickly in urban environments, i.e., on concrete or asphalt surfaces. To anchor the tent, weights such as sand bags or drums of water are typically employed. However, the use of weights poses a difficulty in obtaining and moving the material for the weights, or in obtaining and moving the weights themselves. These aspects of the use of weights as anchors as well as other aspects of the weights, such as the ready availability of sand or dirt in the urban environment, make it more difficult to move and erect the tent quickly.

In the construction industry, it is often imperative to provide fall protection for the workers. Typically, contractors build-in specialized harnessing hardware at predetermined locations on or in the structures as they are built. The harnessing hardware is specially adapted to accept inserts that are difficult to use because they tend to fill up with concrete. As the locations for the built-in hardware are predetermined, it may be determined later that they have not been placed precisely where they are needed, yet they will often be used anyway, posing risk of extreme injury or death. Moreover, as permanent or semi-permanent installations, they may be used by subcontractors or others when this is not anticipated or desired, so that the contractor assumes a risk of liability for injuries or deaths that result from the imprudent use of the harnessing hardware by others.

Also in the construction industry, there is often a need to move large objects or materials, such as boulders. Irregularly shaped objects such as boulders present particular difficulties in grasping; often chains must be wrapped around a boulder or other irregularly shaped object to secure it. Prefabricated structural materials, such as concrete facades, are typically provided with hardware for attaching chains or cables; however, these also may be found insufficient during actual construction.

There is also a need for retrofitting bridges and other structures with tying cables to increase earthquake resistance, and tying one or more large objects together. Presently, the cables are secured to hardware which is bolted to the structure with a number of bolts, requiring that a number of corresponding holes be drilled in the structure.

Emergency workers must sometimes assemble structures used for maneuvering in urban environments quickly, to respond to man-made and natural disasters. For example, emergency workers may need to climb the face of buildings, or provide hoists for elevating people and equipment, or anchor ladders to man-made structures such as brick or concrete-faced buildings as well as natural features such as rocks.

Accordingly, there is a need for an expansion bolt that provides a simple, reliable and relatively inexpensive means for connecting a cable, rope or wire to a drilled hole in a hard material, that is easy to install in and remove from the hole, and that effectively anchors to the hole while applying a minimum stress to the hole, while providing a minimum sensitivity to the angular orientation of the expansion bolt in the hole. There is more particularly a need to provide all of these features for use in a hole drilled in concrete or another hard but relatively brittle or weak material.

SUMMARY

A preferred expansion bolt according to the present invention provides a cable, an inner chock, at least two outer chocks, and a compression spring. The inner chock is connected to an end of the cable and has at least a first outer ramping surface and a second outer ramping surface. The at least two outer chocks have respective inner ramping surfaces complementarily corresponding to the first and second outer ramping surfaces respectively. The outer chocks are adapted for relative movement along a longitudinal axis of the cable with respect to the inner chock over a predetermined range wherein, in a first direction of movement, the respective inner and outer ramping surfaces slidingly cooperate to radially expand the expansion bolt and, in an opposite direction of the movement, the respective inner and outer ramping surfaces permit radial contraction of the expansion bolt. The compression spring biases the outer chocks with respect to the inner chock in the first direction.

An alternative preferred expansion bolt according to the present invention provides a cable, an inner chock, and at least one outer chock. The inner chock is connected to an end of the cable and has an outer ramping surface. The at least one outer chock has an inner ramping surface complementarily corresponding to the outer ramping surface. The at least one outer chock is adapted for relative movement along a longitudinal axis of the cable with respect to the inner chock over a predetermined range wherein, in a first direction of movement, the inner and outer ramping surfaces slidingly cooperate to radially expand the expansion bolt and, in an opposite direction of the movement, the inner and outer ramping surfaces permit radial contraction of the expansion bolt. The at least one outer chock has a substantially cylindrical outer surface for making contact with the interior surface of a round hole. The outer surface includes a slip-resistant gripping pattern for increasing the slip-resistance of the at least one outer chock with respect to the hole when the expansion bolt is inserted and expanded therein.

Another alternative embodiment of an expansion bolt according to the present invention provides a cable, an inner chock, at least one outer chock, and a cleaning bushing. The inner chock is connected to an end of the cable and has at least a first outer ramping surface. The at least one outer chock has an inner ramping surface complementarily corresponding to the first outer ramping surface. The at least one outer chock is adapted for relative movement along a longitudinal axis of the cable with respect to the inner chock over a predetermined range wherein, in a first direction of movement, the inner and first outer ramping surfaces slidingly cooperate to radially expand the expansion bolt and, in an opposite direction of the movement, the inner and first outer ramping surfaces permit radial contraction of the expansion bolt. The cleaning bushing is slidably received on the cable so as to make contact, at a distal-most position of the cleaning bushing, with a proximal face of the inner chock.

BRIEF DESCRIPTION OF THE DRAWINGS

FIG. 5 is a pictorial view of a third embodiment of an expansion bolt according to the present invention.

FIG. 6 is a cross-sectional view of an outer chock of the expansion bolt of FIG. 5, taken along a line 6-6 thereof.

DETAILED DESCRIPTION OF A PREFERRED EMBODIMENT

Figure 1:
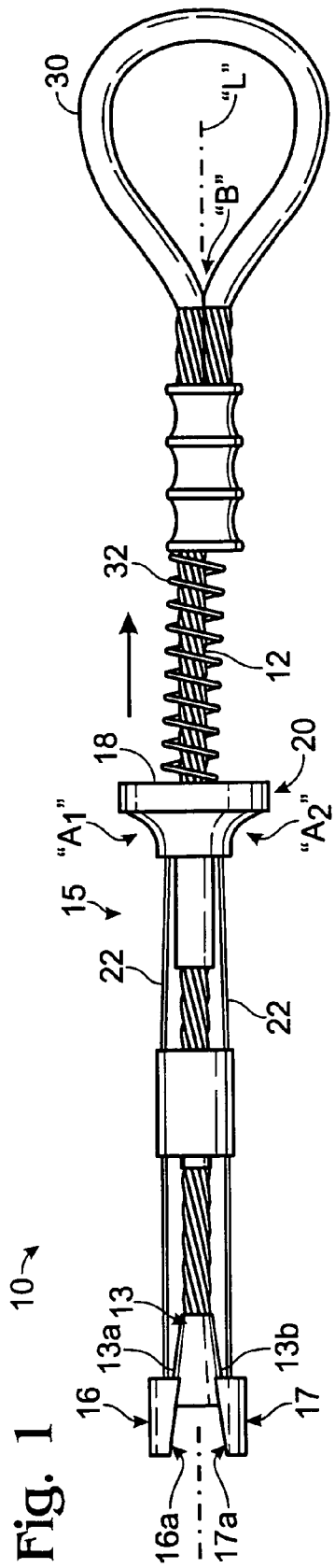
FIG. 1 is a pictorial elevational view of an expansion bolt according to the present invention.

Referring to FIG. 1, an expansion bolt 10 according to the present invention is shown. The expansion bolt 10 provides exceptional advantage for engaging cylindrical holes drilled or bored into concrete or other hard, but brittle or relatively weak material. However, the bolt 10 may be employed for engaging a hole of any shape, either specially provided or existing, in any solid material for any desired purpose without departing from the principles of the invention.

As is common in the art, the expansion bolt 10 includes a cable 12 having at a chock at a distal end thereof. According to the invention, a center chock 14 is provided having an outer surface 13 and a cooperating outer chock assembly 15 is provided to engage the center chock and to accommodate linear movement of the cable 12 along a longitudinal axis "L" with respect thereto. For example, the cable may be passed through a hole 18 in a collar 20 supporting the chock assembly 15.

The outer chock assembly 15 includes at least one outer chock, such as the outer chock referenced as 16, and preferably includes two or more outer chocks, such as the outer chocks referenced as 16 and 17. Each outer chock is preferably attached to the collar 20 through a respective elongate control cable or rod 22 that permits moving the outer chock upwardly along the longitudinal axis with respect to the inner chock by pushing upwardly on the collar 20.

The outer chocks 16 and 17 have inner surfaces 16a and 17a against which the outer surface 13 of the center chock 14 slides as a result of relative linear movement of the cable with respect to the collar 20. Particularly, when the collar 20 is pushed upwardly along the axis "L" in the direction of the arrow with respect to the cable, the outer chocks are forced radially outwardly, to provide an expanded configuration of the expansion bolt. When introduced into a hole, this outward expansion of the outer chocks is resisted by the inner surface of the hole, anchoring the expansion bolt in the hole. Conversely, when the collar is pulled downwardly with respect to the cable, the outer chocks are free to move inwardly toward the inner chock, or may be biased toward the inner chock by the respective control cables or rods 22, to provide a contracted configuration of the expansion bolt. This permits removing the expansion bolt from the hole.

Figure 2:
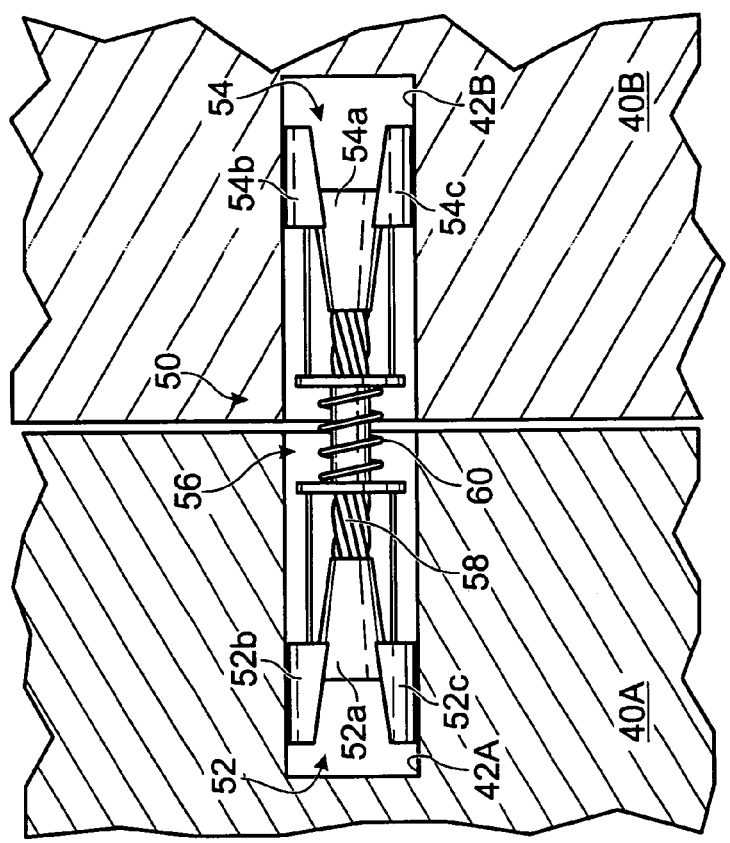
FIG. 2 is a broken detail of the expansion bolt of FIG. 1.

Referring to FIG. 2, to provide for this wedging action, a portion 13a of the outer surface 13 and the inner surface 16a, and a portion 13b of the outer surface 13 and the inner surface 17a, are cooperatively configured as ramping surfaces, i.e., each is inclined at non-zero angles $\theta$ with respect to the axis "L." The portions 13a and 13b are preferably identical portions of the surface 13 for use with identical outer chocks 16 and 17; however, this is not essential to the invention. The ramping surfaces may have any shape that functions as a ramp, including simple planar surfaces and more complex curvilinear surfaces that may include longitudinal grooves, splines or other surface features. In a preferred embodiment of the invention, all portions of the outer surface 13 of the center chock 14 are convex or concave, and the corresponding inner surfaces of the outer chocks are complementarily concave or convex.

For example, FIG. 1 shows a center chock 14 having a convex outer surface 13 including convex portions 13a and 13b, along with outer chocks 16 and 17 having complementary concave inner surfaces. Preferably, the surfaces 13, 16a and 17a are each rotationally symmetric about the longitudinal axis "L," and more preferably still, the surfaces of the center and outer chocks are complementarily frustoconically shaped. An example of complementarily frustoconically shaped center and outer chocks is shown in the Figures. Here, the center chock is shaped as a frustrum so that the surface 13 is convex and the outer chock surfaces 16a and 17a are concave and substantially conform to the frustrum. The reverse geometry may also be employed for this example, wherein the surfaces 16a and 17a are convex and shaped as portions of frustrums, and the center chock surface 13 is concave and substantially conforms to these portions. Moreover, the surfaces 13, 16a and 17a may include only portions that are complementarily frustoconical where desired.

The complementarily frustoconical shapes provide a preferred means for ensuring intimate conformance between the respective ramping surfaces of the center and outer chocks over a range of relative linear movement therebetween, wherein the force exerted between the chocks is distributed over a maximum surface area. This increases reliability by decreasing stress and wear, as well as increases hole-engaging strength by permitting the aforementioned force to be maximized.

Two substantially identical outer chocks 16 and 17 are preferably provided to be azimuthally symmetrically disposed about the longitudinal axis "L" such as shown in FIG. 2, wherein the azimuthal spacing between the outer chocks is 180 degrees, so that the two chocks are disposed diametrically apart from one another. Preferably, the two chocks are disposed equal radial distances "r" from the axis "L" as shown to maximize the symmetry desired for engaging a cylindrical hole of a homogeneous material. Additional chocks may be provided for additional hole-engaging strength at additional cost. Where additional outer chocks are provided, these are also preferably spaced apart azimuthally symmetrically about the axis "L," e.g., 120 degree azimuthal spacing would preferably be employed for three outer chocks.

Azimuthal and radial symmetry of the chocks with respect to the longitudinal axis "L" each contribute to providing optimum holding strength in a cylindrical bore-hole in a homogeneous material; however, non-symmetric arrangements may be advantageous when the bore-hole is asymmetric or is bored into non-homogeneous material. Both the azimuthally symmetric disposition of the chocks and the rotationally symmetric form of the chock surfaces 13, 16a and 17a also contribute to achieving maximum robustness to relative rotation of the chocks about the longitudinal axis.

A loop 30 is provided at a proximal end of the cable 12 providing a hand-hold for a user of the expansion bolt 10, and a means for moving the cable with respect to the collar 20. A compression spring 32 is provided between the loop 30 and the collar 20, to bias the device into its expanded configuration. The compression spring is believed to provide outstanding advantages. Most importantly, it is believed that the constant force exerted by the spring on the outer chocks to urge the outer chocks into the hole with respect to the loop 30 protects against small amounts of slippage out of the hole that may otherwise occur as a result of the surface of the hole crumbling or deforming in response to the load applied to the loop 30. Even very small amounts of slippage may lead to a catastrophic loss of grip with potentially very serious consequences. In addition, the spring provides the outstanding convenience of urging the outer chocks into the hole with single-handed operation of the expansion bolt. With the spring 32 in place and the expansion bolt grasped in one hand like a syringe, e.g., the index and middle fingers are positioned on the collar 20 (at "$A_1$" and "$A_2$", respectively, in FIG. 1) and the thumb in the loop 30 (at "B" in FIG. 1), the collar can be pulled back against the spring bias for inserting the expansion bolt in to the hole and simply released for chocking the expansion bolt snugly into the hole.

The spring 32 has a spring constant of at least 3 pounds per foot, and preferably in the range of about 4-7 pounds per foot.

The use of at least two outer chocks 16 and 17 along with the center chock 14 provides an outstanding advantage of the invention. Particularly, the center chock does not come into contact with the internal surfaces of the hole in which the expansion bolt is engaged. This distributes the force exerted between the center and outer chocks over the outer surface area of the outer chocks, and this force is in turn applied to the inner surfaces of the hole with a much reduced stress. This is particularly important when installing the expansion bolt in concrete, which is while strong in compression, is brittle and easily fractured by tensile stress, or asphalt, which is relatively weak. Further, the use of a centralized chock disposed substantially along the elongate axis of the hole and at least two outer chocks distributes the stress more symmetrically and therefore uniformly over the internal surface of the hole, reducing the potential for creating regions of relative overstress. These outstanding advantages open the door to a number of new applications for the expansion bolt, which have been recognized the present inventors.

As one of these applications, an emergency or temporary tent may be erected and anchored to a concrete or asphalt surface with the expansion bolt of the present invention. In the construction industry, the expansion bolt 10 may be used by drilling holes in structures as the need arises to provide a harness point for fall protection. The expansion bolt may be placed precisely where it is needed and removed immediately upon completion of the task so that it is not available for uncontrolled subsequent use by others. For moving large objects such as boulders, a single hole drilled in the object may provide a sufficient anchor. In that regard, the present inventors have constructed an expansion bolt according to the present invention with a 20 ton holding strength.

Emergency workers may drill holes in structures where needed to employ the expansion bolt 10 for anchoring ladders, hoists, or other structures or devices that must be deployed quickly and efficiently under difficult conditions. The expansion bolt 10 may be used in many different urban building materials, such as brick, concrete and even wood.

There are many other possibilities for using the expansion bolt 10 as a result of its outstanding features. Mentioned above are some uses that provide for quick assembly and disassembly. However, more permanent installations of the expansion bolt 10 may also be used due to its outstanding strength and versatility. Some examples are retrofitting bridges and other structures with tying cables to increase earthquake resistance, and tying one or more large objects together.

Figure 3:
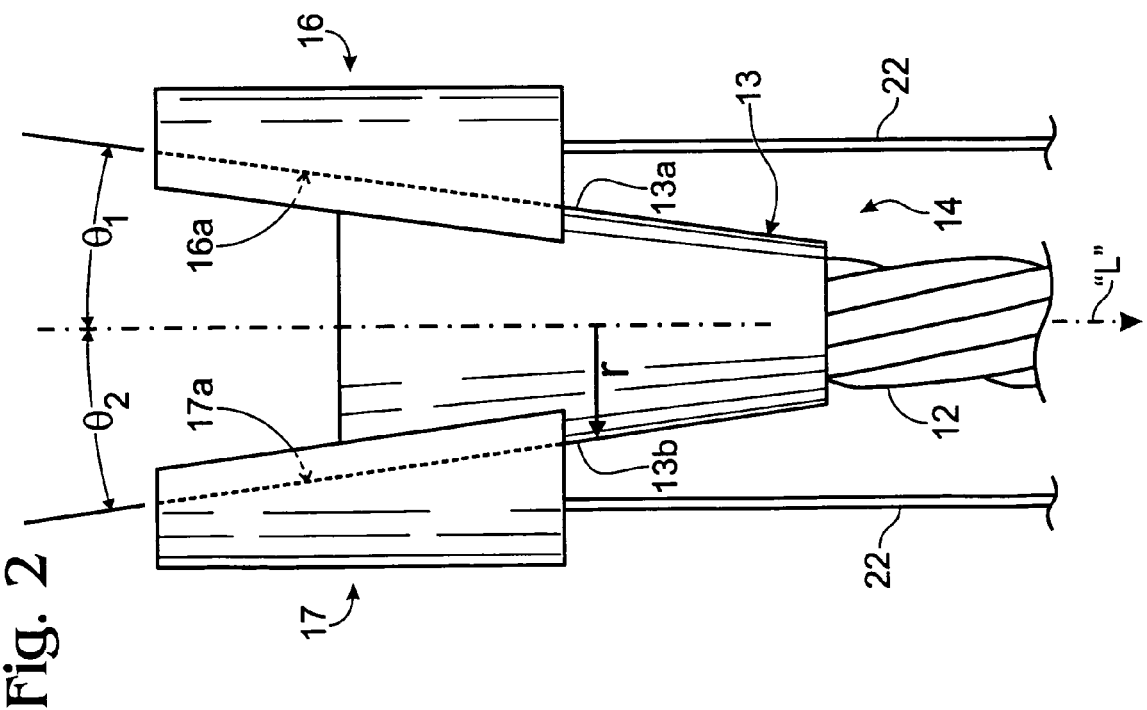
FIG. 3 is a double-ended version of the expansion bolt of FIG. 1, shown coupling two panels together.

As an example of the latter, a double-ended version 50 of the expansion bolt 10, such as shown in FIG. 3, can be sandwiched between two structures 40A and 40B for anchoring the structures together. The double-ended expansion bolt 50 has one head 52, which includes a center chock 52a, and two outer chocks 52b and 52c, that is inserted into a hole 42A. The bolt 50 has another head 54, which includes a center chock 54a, and two outer chocks 54b and 54c, that is inserted into a corresponding hole 42B in the object 40B. In one embodiment of the expansion bolt 50, the outer chocks for both heads are tied together by a coupler 56, and a cable 58 connects the center chocks of each head.

To hold the two objects together, the cable 58 must be tensioned with respect to the position of the outer chocks 52b, c and 54b, c. As one means for providing this tension, the coupler 56 may be linearly expandable and include a compression spring 60 to exert a force tending to force the outer chocks for each head apart from one. This force is communicated to the cable 58 through the ramping surfaces of the chocks. The objects 40A and 40B will be held together by friction between the interior surface of the hole and the outer surfaces of the outer chocks, which develops in response to the force exerted by the spring. To illustrate a fully equivalent means for providing the aforementioned tension, the coupler 56 may be provided so that it is not linearly expandable while the cable is provided with a tension spring for linearly contracting the cable.

Figure 4:
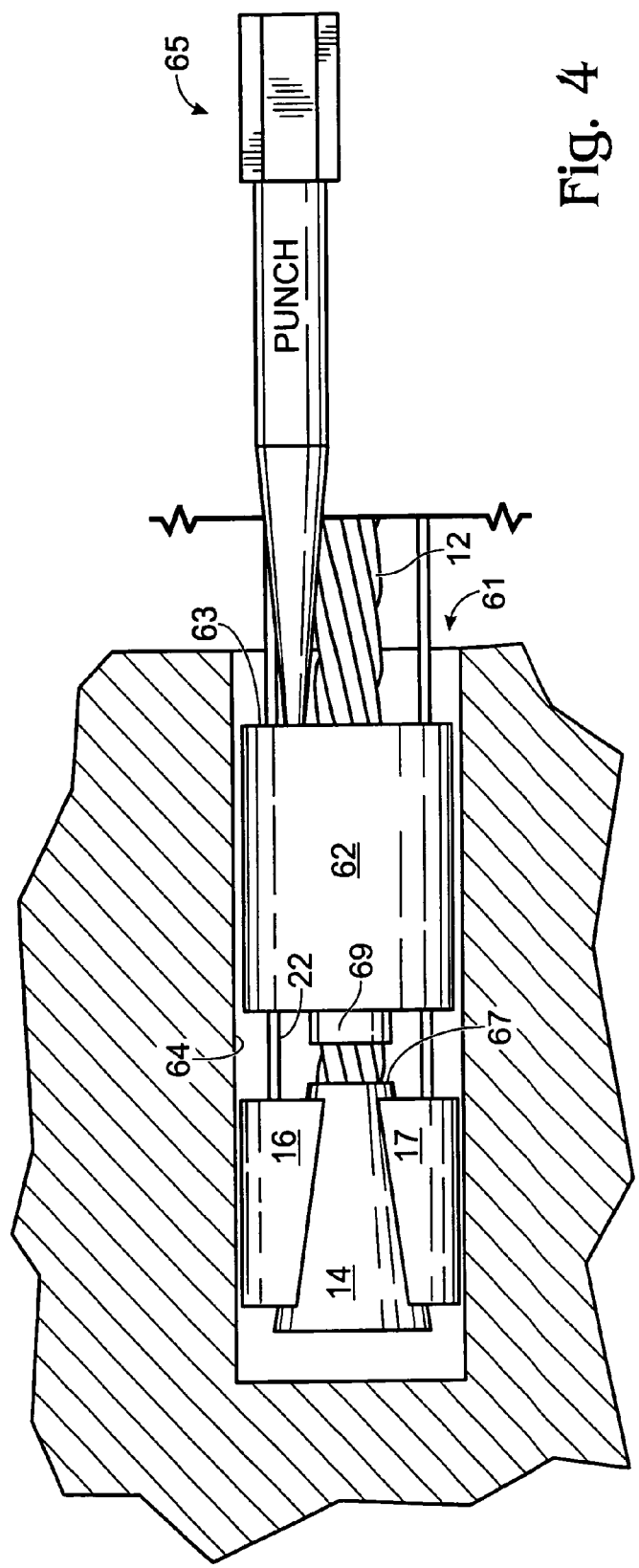
FIG. 4 is a cross-section of a second embodiment of an expansion bolt according to the present invention shown inside a hole.

Turning to FIG. 4, a second embodiment 60 of an expansion bolt according to the present invention is shown. The expansion bolt 60 provides a "cleaning bushing" 62 that is slidably received on the cable 12. The expansion bolt 60 is shown with a preferred two outer chocks 16 and 17, but more or fewer outer chocks may be provided without departing from the principles of the invention. When the expansion bolt is expanded in a hole 61, the cleaning bushing 62 in a distal-most position thereof may be used to apply force to the center chock 14 to loosen the grip applied by the expansion bolt to the hole, for removing the expansion bolt after use. For example, a hammer (not shown) may be used to strike a face 63 of the cleaning bushing, or such a hammering force may be applied through use of a punch, chisel or like tool 65 as shown, the hammering force being transmitted by the cleaning bushing to a proximal face 67 of the center chock 14 to force the center chock away from the outer chocks 16 and 17, allowing the outer chocks to move radially inwardly and relax the grip of the expansion bolt so that it can be pulled out of the hole.

In the embodiment shown, the cleaning bushing has a large diameter to increase the size of the face 63, so the control cables or rods 22 slidably extend therethrough. A smaller diameter distal portion 69 may be used to make contact with the proximal face 67 of the center chock. It is generally desirable to provide a smaller diameter distal portion 69 of the cleaning bushing for making this contact, and such provision may be necessary where the diameter of the face 63 is larger than the diameter of the hole.

Turning to FIG. 5, a third embodiment 70 of an expansion bolt according to the present invention is shown. The expansion bolt 70 incorporates many of the same features as the expansion bolt 10. The bolt 70 preferably includes at least two outer chocks 72a and 72b. An inner chock 76 is provided at a distal end of a cable 78. As for the cable 12, the cable 78 is preferably formed of flexible wire but other cable materials could be used. The cable is sufficiently strong to provide adequate fall protection, while the flexibility of the cable provides for minimizing the transfer of shear forces to the object, which is especially advantageous when the object is weak in shear, or has relatively thin walls.

A loop 80 is provided at a proximal end of the cable providing an anchoring eye for connection to, e.g., a safety harness. The cable is carried through the loop by a metal guard 82 for protecting the cable from being cut by anchoring hardware. The cable extends through a collar 84 that has an outer diameter "D" that is sized to fit the hole in which the expansion bolt 70 is to be inserted. The collar 84 bears on the surface of the object around the hole so that it is prevented from passing through the hole. The collar includes two, preferably flexible, control cables 86a, 86b attached respectively to the outer chocks.

The bolt 70 preferably has a cleaning bushing 73 similar to that described above in connection with FIG. 4. In this example, the cleaning bushing 73 has a sufficiently small diameter face 74 that the control cables 86 do not pass through the cleaning bushing.

A compression spring 88 biases the collar 84 toward the distal end of the cable 78. The collar 84 in turn biases the outer chocks 72 through the control cables 86 so that the inner chock 76 wedges the outer chocks radially outwardly to expand the bolt 70. Preferably, the inner chock 76 is frustoconical, but any wedge shaped member could be used with one or more outer chocks having complementary or cooperative surfaces.

The bolt 70 includes an additional feature adapting it for gripping strong surfaces, such as the interior surfaces of metal tubing. Such tubing may be installed in pre-cast concrete panels for building construction, and can be used to provide anchor points for fall protection.

More particularly, referring in addition to FIG. 6, the outer chocks 72a and 72b have a modified, substantially cylindrical shape that includes a slip-resistant gripping pattern similar in function to that of the tread on a tire or shoe sole. The gripping pattern generally comprises raised portions and relatively depressed portions. In a preferred embodiment, the relatively depressed portions are grooves 73 that define raised ridges 74. The relatively depressed portions, e.g., the grooves 73, provide relief for receiving scale and other debris that may become loosened during installation of the bolt 70, and that may otherwise interrupt contact between the outer chocks and the hole. In addition, the raised portions, e.g., the ridges 74, "bite" into the interior surface of the hole. Preferably, the grooves are square cut, but the grooves can be "V" cut or have any other desired cross-section. Preferably, the grooves are axially oriented, i.e., perpendicular to the longitudinal axis "L" of the bolt 72 along which the anchoring or pulling force will be directed. However, the grooves may have some other angular relationship to the axis "L," or may be helical. A preferred gripping pattern has grooves that are about $3/32$" wide and about $3/32$" deep, and are spaced regularly apart about 28 grooves in 3", defining ridges that are about $1/16$" wide.

Other gripping patterns may be provided as desired. For example, the raised portions may be localized convexities such as bumps or other protrusions, and/or the relatively depressed portions may be localized concavities such as dimples or other recesses. Preferably, about 50% of the surface area of the outer surface area of the outer chocks is provided as relatively depressed portions with the remaining 50% of the surface area provided as raised portions, though this proportion can vary as well. As will be appreciated from the principle articulated above, the size of the relatively depressed portions is preferably sufficient to wholly receive the scale or other surface material that is anticipated to be loosened in the particular application.

It is to be recognized that, while a particular expansion bolt has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. An expansion bolt for releasably gripping a hole surface, comprising:
    a cable;
    a first chock connected to a first end of said cable;
    a second chock for cooperation with said first chock such that translation of said second chock relative to said first chock in a first direction causes said chocks to slidingly assume relative positions corresponding to an expanded configuration of the expansion bolt that grips the hole surface, and translation of said second chock relative to said first chock in a second direction opposite said first direction causes said chocks to slidingly assume relative positions corresponding to a contracted configuration of the expansion bolt that releases the grip on the hole surface; and
    a cleaning bushing slidably connected to said cable, said cleaning bushing in response to application of an impact force thereto transmitting a force to one of said first and second chocks that results in a translation of said second chock relative to said first chock in said second direction.

2. The expansion bolt of claim 1, wherein said force is an impact force, and wherein said cleaning bushing is adapted to receive said impact force from a hand-tool that makes contact with said cleaning bushing.

3. An expansion bolt for releasably gripping a hole surface, comprising:
    a cable;
    a center chock connected to a first end of said cable;
    an outer chock assembly comprising a plurality of outer chocks slidably engaging said center chock, said center and outer chocks being configured so that translation of said outer chocks in a first direction relative to said center chock causes said outer chocks to become more radially spaced apart, defining an expanded configuration of the expansion bolt for gripping the hole surface, and so that translation of said outer chocks in a second direction opposite said first direction causes said outer chocks to become less radially spaced apart, defining a contracted configuration of the expansion bolt for releasing the grip on the hole surface; and a cleaning bushing slidably connected to said cable said cleaning bushing in response to application of an impact force thereto transmitting a force to said center chock that results in a translation of said outer chocks relative to said center chock in said second direction.

4. The expansion bolt of claim 3, wherein said force is an impact force, and wherein said cleaning bushing is adapted to receive said impact force from a hand-tool that makes contact with said cleaning bushing.

* * * * *